US011192231B2

(12) United States Patent
Kano et al.

(10) Patent No.: US 11,192,231 B2
(45) Date of Patent: Dec. 7, 2021

(54) POWER SUPPLY SYSTEM, POWER TOOL SYSTEM, AND POWER TOOL

(71) Applicant: MAKITA CORPORATION, Anjo (JP)

(72) Inventors: Hayato Kano, Anjo (JP); Akihiro Yamada, Anjo (JP); Hiroki Kaneko, Anjo (JP)

(73) Assignee: MAKITA CORPORATION, Anjo (JP)

( * ) Notice: Subject to any disclaimer, the term of this patent is extended or adjusted under 35 U.S.C. 154(b) by 134 days.

(21) Appl. No.: 16/618,853

(22) PCT Filed: May 22, 2018

(86) PCT No.: PCT/JP2018/019686
§ 371 (c)(1),
(2) Date: Dec. 3, 2019

(87) PCT Pub. No.: WO2018/225499
PCT Pub. Date: Dec. 13, 2018

(65) Prior Publication Data
US 2020/0130163 A1 Apr. 30, 2020

(30) Foreign Application Priority Data
Jun. 8, 2017 (JP) ............................ JP2017-113754

(51) Int. Cl.
*B25F 5/02* (2006.01)
*H02J 1/00* (2006.01)
(Continued)

(52) U.S. Cl.
CPC ................ *B25F 5/02* (2013.01); *A41D 1/002* (2013.01); *A41D 1/02* (2013.01); *A41D 19/0037* (2013.01); *H02J 1/00* (2013.01)

(58) Field of Classification Search
CPC ... B25F 5/02; B25F 5/00; A41D 1/002; A41D 1/02; A41D 19/0037; H02J 1/00
(Continued)

(56) References Cited

U.S. PATENT DOCUMENTS

2013/0088200 A1* 4/2013 Kamishima ........... H01M 10/44
320/109

FOREIGN PATENT DOCUMENTS

DE 19926241 A1 5/2002
JP 2003-295308 A 10/2003
(Continued)

OTHER PUBLICATIONS

Oct. 6, 2020 Office Action issued in Japanese Patent Application No. 2017-113754.
(Continued)

*Primary Examiner* — Toan T Vu
(74) *Attorney, Agent, or Firm* — Oliff PLC

(57) ABSTRACT

A power supply system includes a wearing part worn on a hand of a worker, a connecting member held by the wearing part, and a control circuit. The connecting member is disposed at a position where it is attached to a tool-side attachment part provided on a grip of a power tool when the worker grips the grip. The connecting member includes, in an exposed manner, a power source terminal that supplies electric power to the power tool and a signal terminal that receives a response signal from the power tool, which are electrically connected to the power tool in an attached state where the connecting member is attached to the tool-side attachment part. The control circuit makes the power source terminal and a power source unit electrically continuous when the signal terminal receives the response signal and makes them electrically discontinuous when the signal terminal receives no response signal.

8 Claims, 13 Drawing Sheets

(51) Int. Cl.

| | |
|---|---|
| ***A41D 19/00*** | (2006.01) |
| ***A41D 1/00*** | (2018.01) |
| ***A41D 1/02*** | (2006.01) |

(58) Field of Classification Search
USPC .......................................................... 307/326
See application file for complete search history.

(56) References Cited

FOREIGN PATENT DOCUMENTS

| | | | | |
|---|---|---|---|---|
| JP | 2003295308 | | * | 10/2003 |
| JP | 2009-196072 | A | | 9/2009 |
| JP | 2009196072 | | * | 9/2009 |
| JP | 2010-158126 | A | | 7/2010 |
| JP | 2010158126 | | * | 7/2010 |
| JP | 2017-41983 | A | | 2/2017 |

OTHER PUBLICATIONS

Jun. 26, 2018 International Search Report issued in International Patent Application No. PCT/JP2018/019686.

* cited by examiner

POWER SUPPLY SYSTEM, POWER TOOL SYSTEM, AND POWER TOOL

FIELD

The present invention relates to a power supply system, a power tool system, and a power tool.

BACKGROUND

As disclosed in Patent Literature 1, there has been proposed a configuration including terminals provided to a wearing member worn on a hand of a worker for a power supply system that supplies electric power to a power tool. In the power supply system, the terminals are electrically connected to the power tool when the worker wearing the wearing member grips a grip of the power tool.

CITATION LIST

Patent Literature

Patent Literature 1: Japanese Patent Application Laid-open No. 2009-196072

SUMMARY

Technical Problem

In the configuration according to Patent Literature 1, two terminals are disposed side by side in a manner exposed from the wearing member. If a conductive member comes into contact with the two terminals, an electrical short circuit may possibly occur between the terminals.

An aspect of the present invention has been made in view of the above circumstance and has an object to provide a power supply system, a power tool system, and a power tool that are capable of preventing an electrical short circuit between terminals.

Solution to Problem

According to an aspect of the present invention, a power supply system includes a wearing part, a connecting member, and a control circuit. The wearing part is worn on a hand of a worker. The connecting member is held by the wearing part. The connecting member is disposed at a position where it is attached to a tool-side attachment part provided on a grip of a power tool when the worker wearing the wearing part grips the grip. The connecting member has a terminal arrangement surface having a planar shape and provided with a power source terminal and a signal terminal in an exposed manner. The power source terminal supplies electric power to the power tool. The signal terminal receives a response signal from the power tool. The power source terminal and the signal terminal are electrically connected to the power tool in an attached state where the connecting member is attached to the tool-side attachment part. The control circuit makes the power source terminal and a power source unit electrically continuous when the signal terminal receives the response signal and makes the power source terminal and the power source unit electrically discontinuous when the signal terminal receives no response signal.

Advantageous Effects of Invention

An aspect of the present invention provides a power supply system, a power tool system, and a power tool that are capable of preventing an electrical short circuit.

DESCRIPTION OF EMBODIMENTS

Embodiments according to the present invention are described below with reference to the accompanying drawings. The embodiments are not intended to limit the present invention. Components in the embodiments below include components replaceable and easily conceivable by those skilled in the art and components substantially identical therewith.

First Embodiment

Figure 1:
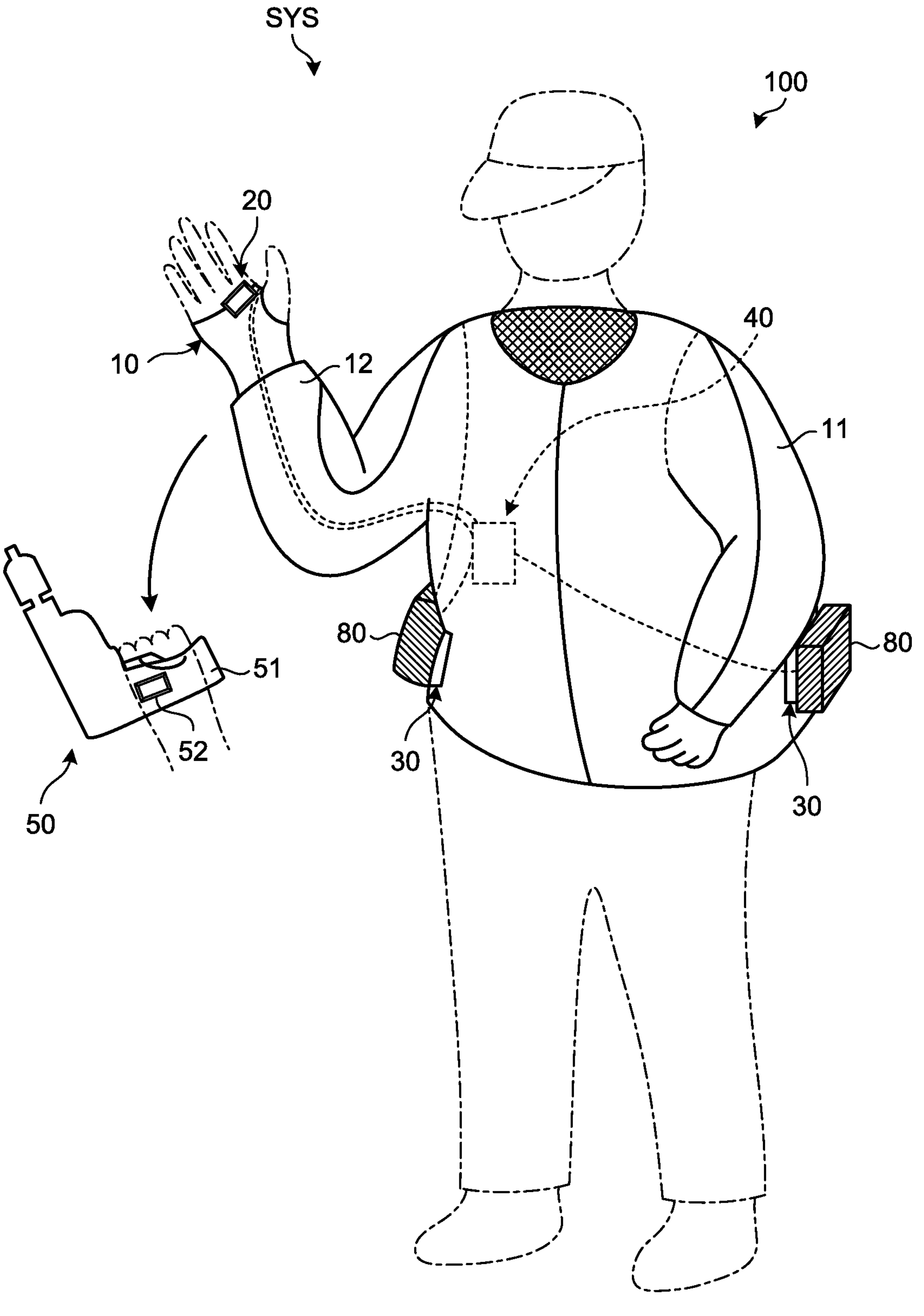
FIG. 1 is a view of an example of a power tool system according to a first embodiment.

FIG. 1 is a view of an example of a power tool system SYS according to a first embodiment. The power tool system SYS includes a power tool 50 and a power supply system 100. The power tool 50 is used by a worker to perform work. While the power tool 50 according to the present embodiment is an electric drill, for example, it is not limited thereto. The present invention is also applicable to other power tools. Examples of other power tools 50 include, but are not limited to, chain saws, bush cutters, nail guns, hammers, hedge trimmers (hedge clippers), grinders, circular saws, other power tools, other gardening tools, etc.

The power tool 50 includes a grip 51 gripped by the worker. The grip 51 is provided with a tool-side attachment part 52 to which the power supply system 100 according to the present embodiment is connected. The tool-side attachment part 52 is provided at a position corresponding to the base part of the index finger and the middle finger on the palm of the worker's hand when the worker grips a predetermined position.

The power supply system 100 supplies electric power to the power tool 50. The power supply system 100 includes a wearing part 10, a connecting member 20, an adapter 30, and a control circuit 40.

Figure 2:
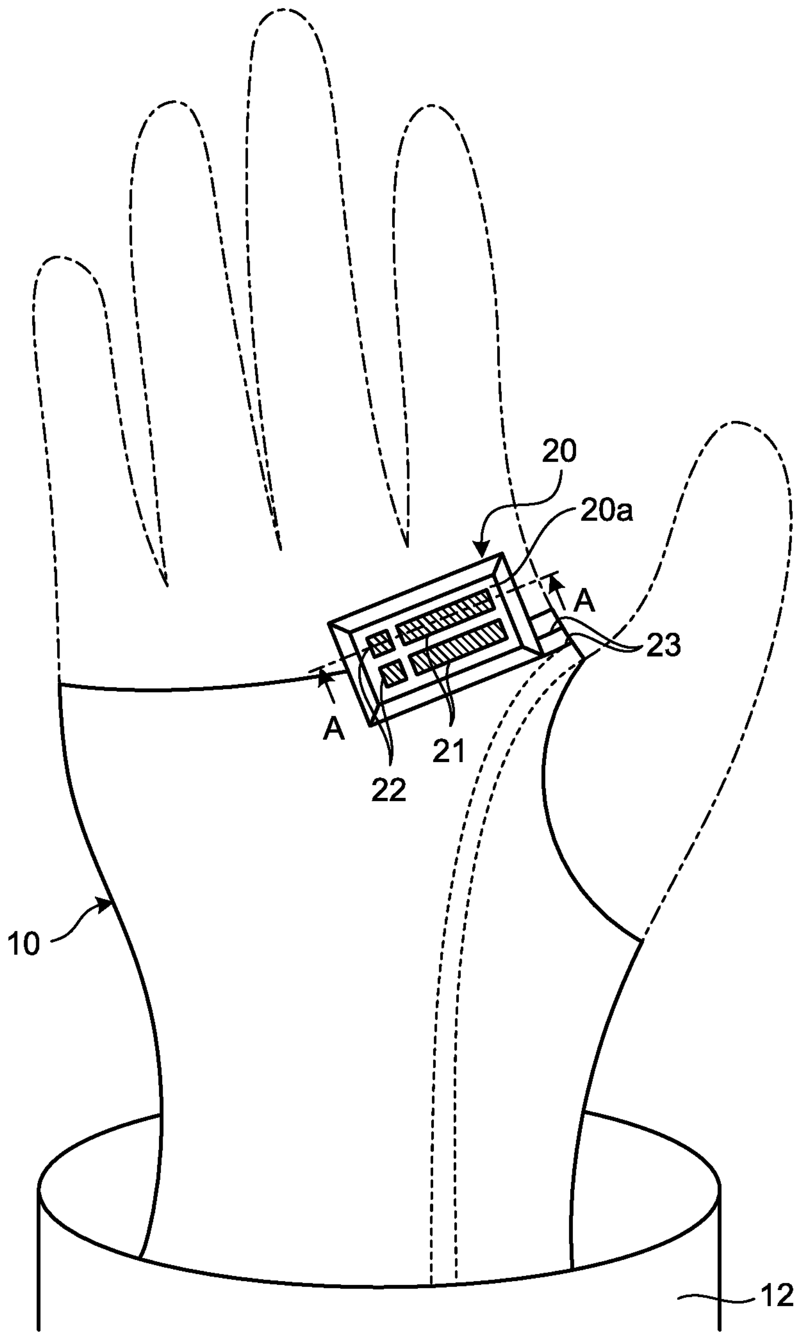
FIG. 2 is a view of an example of a wearing part and a connecting member.

FIG. 2 is a view of an example of the wearing part 10 and the connecting member 20. As illustrated in FIGS. 1 and 2, the wearing part 10 is worn on a hand of the worker. The wearing part 10 covers the palm and the back of the worker's hand with the fingers exposed, for example. While the wearing part 10 extends from the end of a sleeve 12 of a jacket 11, for example, the present embodiment is not limited thereto. The wearing part 10 may be detachable from the jacket 11 (sleeve 12), for example. Furthermore, the wearing part 10 may be separated from the jacket 11 like a glove or a wristband, for example. While the jacket 11 according to the present embodiment is worn on at least the upper half of the worker's body, the present embodiment is not limited thereto. The jacket 11 may be integrated with a pair of pants, for example. While the wearing part 10 and the jacket 11 are made of cloth, for example, the present embodiment is not limited thereto.

The connecting member 20 is held by the wearing part 10. The connecting member 20 is disposed on the palm side of the worker's hand on the wearing part 10. The connecting member 20 is disposed at a position where it is attached to the tool-side attachment part 52 provided on the grip 51 of the power tool 50 when the worker wearing the wearing part 10 grips the grip 51. The connecting member 20, for example, is disposed at a position corresponding to the base part of the index finger and the middle finger on the wearing part 10 when the worker wears the wearing part 10. Disposing the connecting member 20 at this position can prevent the connecting member 20 from being an obstacle in work when the worker wearing the wearing part 10 performs the work. The connecting member 20 is removed from the tool-side attachment part 52 when the worker releases the grip 51.

Figure 3:
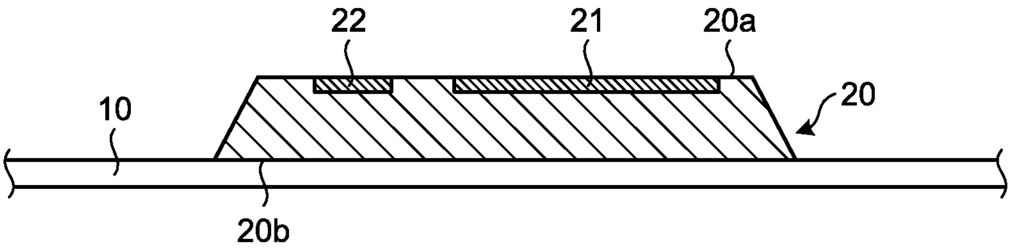
FIG. 3 is a view of a configuration along the A-A section in FIG. 2.

FIG. 3 is a view of a configuration along the A-A section in FIG. 2. As illustrated in FIG. 3, the connecting member 20 has a truncated quadrangular pyramid shape, for example. The connecting member 20 has a terminal arrangement surface 20*a* and a held surface 20*b*. The terminal arrangement surface 20*a* has a rectangular planar shape, for example, on which power source terminals 21 and signal terminals 22 are provided in an exposed manner. The power source terminals 21 and the signal terminals 22 according to the present embodiment are disposed in an exposed manner on the terminal arrangement surface 20*a* serving as a single planar surface. The held surface 20*b* has a rectangular planar shape, for example, and is held by the wearing part 10.

The power source terminals 21 supply electric power to the power tool 50. The power source terminals 21 include a positive electrode terminal 21*a* and a negative electrode terminal 21*b* (refer to FIG. 4 and other figures). The signal terminals 22 receive a response signal from the power tool 50. The signal terminals 22 include a first terminal 22*a* and a second terminal 22*b* (refer to FIG. 4 and other figures). The positions and the shapes of the power source terminals 21 (the positive electrode terminal 21*a* and the negative electrode terminal 21*b*) and the signal terminals 22 (the first terminal 22*a* and the second terminal 22*b*) are not limited thereto. The power source terminals 21 and the signal terminals 22 are connected to the control circuit 40 via respective wires 23. The wires 23 extend from the back side of the worker's hand on the wearing part 10 to the sleeve 12, for example.

Figure 4:
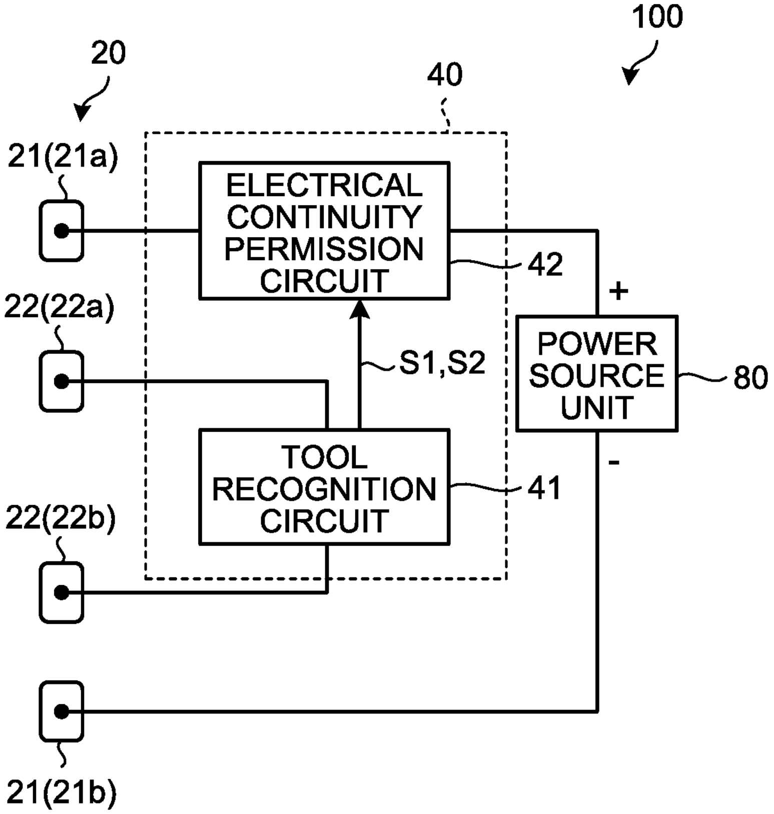
FIG. 4 is a circuit diagram of an electrical configuration of a power supply system.

FIG. 4 is a circuit diagram of an electrical configuration of the power supply system 100. As illustrated in FIG. 4, the power source terminals 21 and the signal terminals 22 are electrically connected to the control circuit 40. The control circuit 40 includes a tool recognition circuit 41 and an electrical continuity permission circuit 42. The tool recognition circuit 41 is connected to the first terminal 22*a* and the second terminal 22*b* of the signal terminals 22. The tool recognition circuit 41 detects whether the signal terminals 22 receive a response signal from the power tool 50. Based on the detection result, the tool recognition circuit 41 outputs an electrical continuity permission signal S1 and an electrical continuity prohibition signal S2 to the electrical continuity permission circuit 42.

The electrical continuity permission circuit 42 is connected to a positive electrode of a power source unit 80, which will be described later, and the positive electrode terminal 21*a* of the power source terminals 21. The negative electrode terminal 21*b* of the power source terminals 21 is connected to a negative electrode of the power source unit 80, which will be described later. The electrical continuity permission circuit 42 receives the electrical continuity permission signal S1 or the electrical continuity prohibition signal S2 output from the tool recognition circuit 41. If the electrical continuity permission signal S1 is input, the electrical continuity permission circuit 42 makes the power source unit 80 and the positive electrode terminal 21*a* electrically continuous. If the electrical continuity prohibition signal S2 is input, the electrical continuity permission circuit 42 makes the power source unit 80 and the positive electrode terminal 21*a* electrically discontinuous. The electrical continuity permission circuit 42 may include a switching element, such as a transistor, that switches the state between the positive electrode of the power source unit 80 and the positive electrode terminal 21*a* between the electrically continuous state and the electrically discontinuous state, for example.

Figure 5:
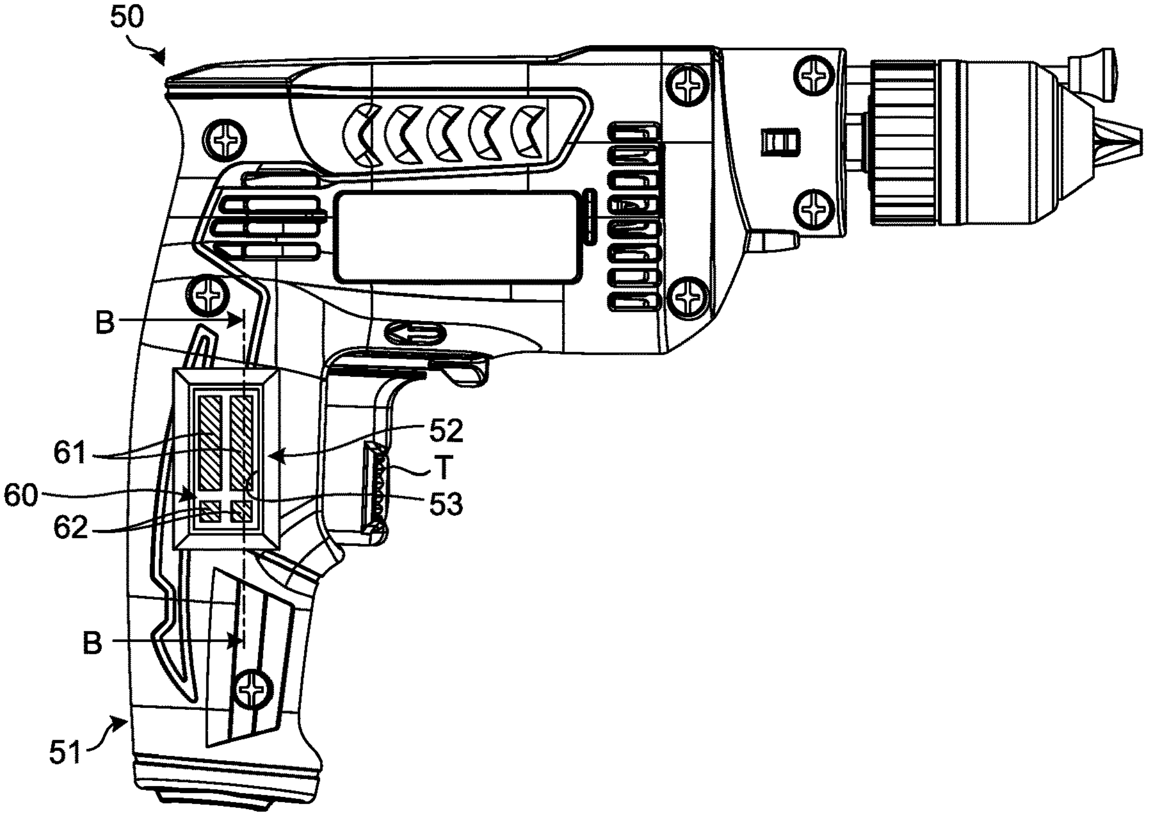
FIG. 5 is a view of an example of a power tool.
Figure 6:
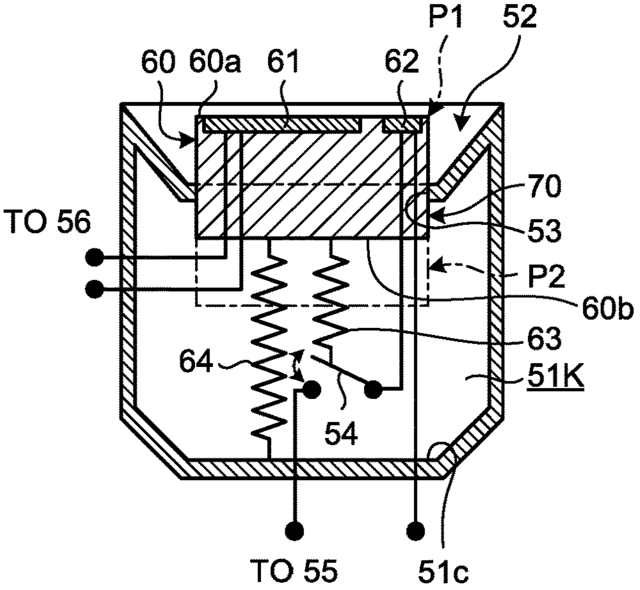
FIG. 6 is a view of a configuration along the B-B section in FIG. 5.

FIG. 5 is a view of an example of the power tool 50. FIG. 6 is a view of a configuration along the B-B section in FIG. 5. As illustrated in FIGS. 5 and 6, the power tool 50 includes the tool-side attachment part 52 at part of the grip 51. The tool-side attachment part 52 has a recess having a shape corresponding to the shape (truncated quadrangular pyramid shape) of the connecting member 20. To the tool-side attachment part 52, the connecting member 20 is fit and attached when the worker wearing the wearing part 10 grips the grip 51.

A tool-side connecting member 60 is disposed in an opening 53. The tool-side connecting member 60 has a rectangular columnar shape, for example, and has a tool-side terminal arrangement surface 60*a* and a supported surface 60*b*. The tool-side terminal arrangement surface 60*a* comes into contact with the terminal arrangement surface 20*a* of the connecting member 20 when the connecting member 20 is attached to the tool-side attachment part 52.

On the tool-side terminal arrangement surface 60*a*, tool-side power source terminals 61 and tool-side signal terminals 62 are provided in an exposed manner. The tool-side power source terminals 61 include a tool-side positive electrode terminal 61*a* and a tool-side negative electrode terminal 61*b* (refer to FIG. 7 and other figures). The tool-side positive electrode terminal 61*a* has a shape corresponding to the positive electrode terminal 21*a* of the power source terminals 21. The tool-side positive electrode terminal 61*a* is disposed at a position where it comes into contact with the positive electrode terminal 21*a* when the connecting member 20 is attached to the tool-side attachment part 52. The tool-side negative electrode terminal 61*b* has a shape corresponding to the negative electrode terminal 21*b* of the power source terminals 21. The tool-side negative electrode terminal 61*b* is disposed at a position where it comes into contact with the negative electrode terminal 21*b* when the connecting member 20 is attached to the tool-side attachment part 52.

Figure 7:
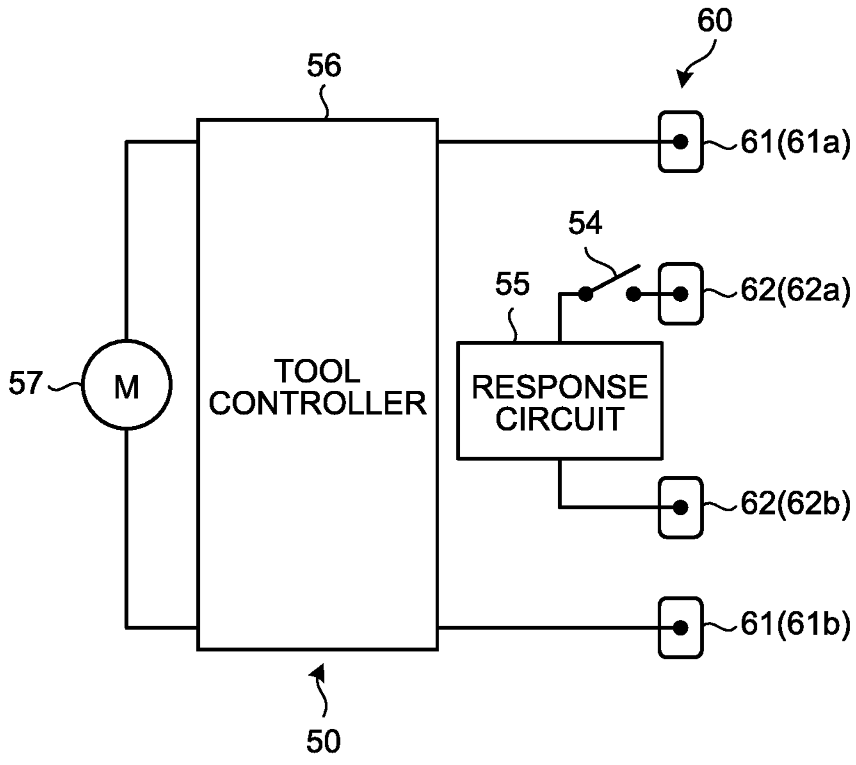
FIG. 7 is a block diagram illustrating an electrical configuration of the power tool.

The tool-side signal terminals 62 include a tool-side first terminal 62*a* and a tool-side second terminal 62*b* (refer to FIG. 7 and other figures). The tool-side first terminal 62*a* has a shape corresponding to the first terminal 22*a* of the signal terminals 22. The tool-side first terminal 62*a* is disposed at a position where it comes into contact with the first terminal 22*a* when the connecting member 20 is attached to the tool-side attachment part 52. The tool-side second terminal 62*b* has a shape corresponding to the second terminal 22*b* of the signal terminals 22. The tool-side second terminal 62*b* is disposed at a position where it comes into contact with the second terminal 22*b* when the connecting member 20 is attached to the tool-side attachment part 52.

The tool-side attachment part 52 has a bottom. The bottom of the tool-side attachment part 52 has the opening 53. The opening 53 communicates with a space 51K for moving the tool-side connecting member 60. The space 51K is formed in the grip 51. The tool-side connecting member 60 is inserted into the space 51K and disposed with the tool-side terminal arrangement surface 60*a* protruding from the opening 53. The supported surface 60*b* of the tool-side connecting member 60 is supported by an inner wall 51*c* defining the space 51K of the grip 51 using an elastic member 64, such as a spring. With this structure, the tool-side connecting member 60 is held at a reference position P1 with no force applied thereto from the outside. When force toward the inside of the tool-side attachment part 52 is applied to the tool-side connecting member 60 from the outside, the elastic member 64 is elastically deformed, thereby enabling the tool-side connecting member 60 to move toward the space 51K. When the force applied in the tool-side attachment part 52 toward the inside of the space 51K is released, the tool-side connecting member 60 returns to the reference position P1 by the elastic force of the elastic member 64.

FIG. 7 is a block diagram of an electrical configuration of the power tool 50. As illustrated in FIG. 7, the power tool 50 includes a switch 54, a response circuit 55, a tool controller 56, and a motor 57. One terminal of the switch 54 is connected to the tool-side first terminal 62*a* of the tool-side signal terminals 62, and the other terminal thereof is connected to the response circuit 55. As illustrated in FIGS. 6 and 7, the switch 54 is coupled to the tool-side connecting member 60 by a link 63. The link 63 according to the present embodiment is an elastic member, such as a spring.

When the tool-side connecting member 60 is pushed toward the space 51K, the elastic member 64 contracts, thereby causing the tool-side connecting member 60 to move to a connection position P2 closer to the space 51K. The movement of the tool-side connecting member 60 pushes the link 63 toward the inside of the space 51K. As a result, the link 63 contracts and exerts elastic force in a direction to close the switch 54. The elastic force closes the switch 54, thereby electrically connecting the response circuit 55 and the tool-side first terminal 62*a* of the tool-side signal terminals 62. When the switch 54 is closed, the response circuit 55 transmits a response signal of the power tool 50 to the tool-side signal terminal 62. When the force pushing the tool-side connecting member 60 toward the space 51K is eliminated, the elastic member 64 is restored, thereby causing the tool-side connecting member 60 to return to the reference position P1. The movement of the tool-side connecting member 60 pushes the link 63 toward the outside of the space 51K. As a result, the link 63 expands and exerts elastic force in a direction to open the switch 54. The elastic force opens the switch 54, thereby cutting off the electrical connection between the response circuit 55 and the tool-side first terminal 62*a* of the tool-side signal terminals 62. When the switch 54 is opened, the response circuit 55 transmits no response signal of the power tool 50 to the tool-side signal terminal 62.

In the tool-side attachment part 52, a switching unit 70 includes the tool-side connecting member 60, the elastic member 64, the switch 54, and the link 63. The switching unit 70 switches electrical connection between the power source terminals 21 and the tool-side power source terminals 61 as well as electrical connection between the signal terminals 22 and the response circuit 55.

When electric power is supplied to the power tool 50 via the tool-side power source terminals 61, the tool controller 56 controls operations of the power tool 50. The tool controller 56 controls the timing and the speed of rotation of the motor 57, for example, based on an operation of the worker. The motor 57 is a drive power source of the power tool 50, for example, and is used to rotate a drill in the present embodiment.

Figure 8:
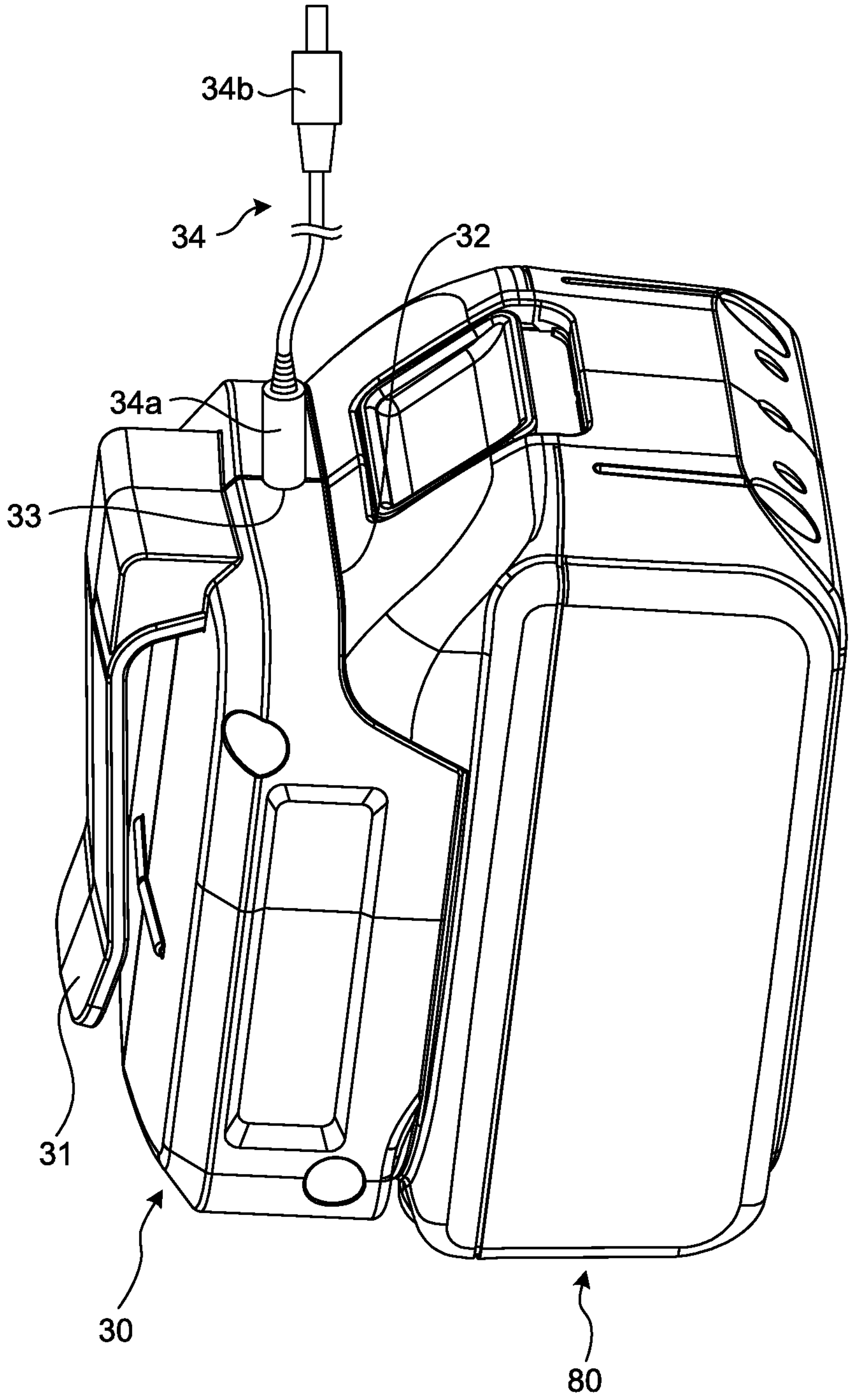
FIG. 8 is a perspective view of an example of an adapter and a power source unit according to the present embodiment.
Figure 9:
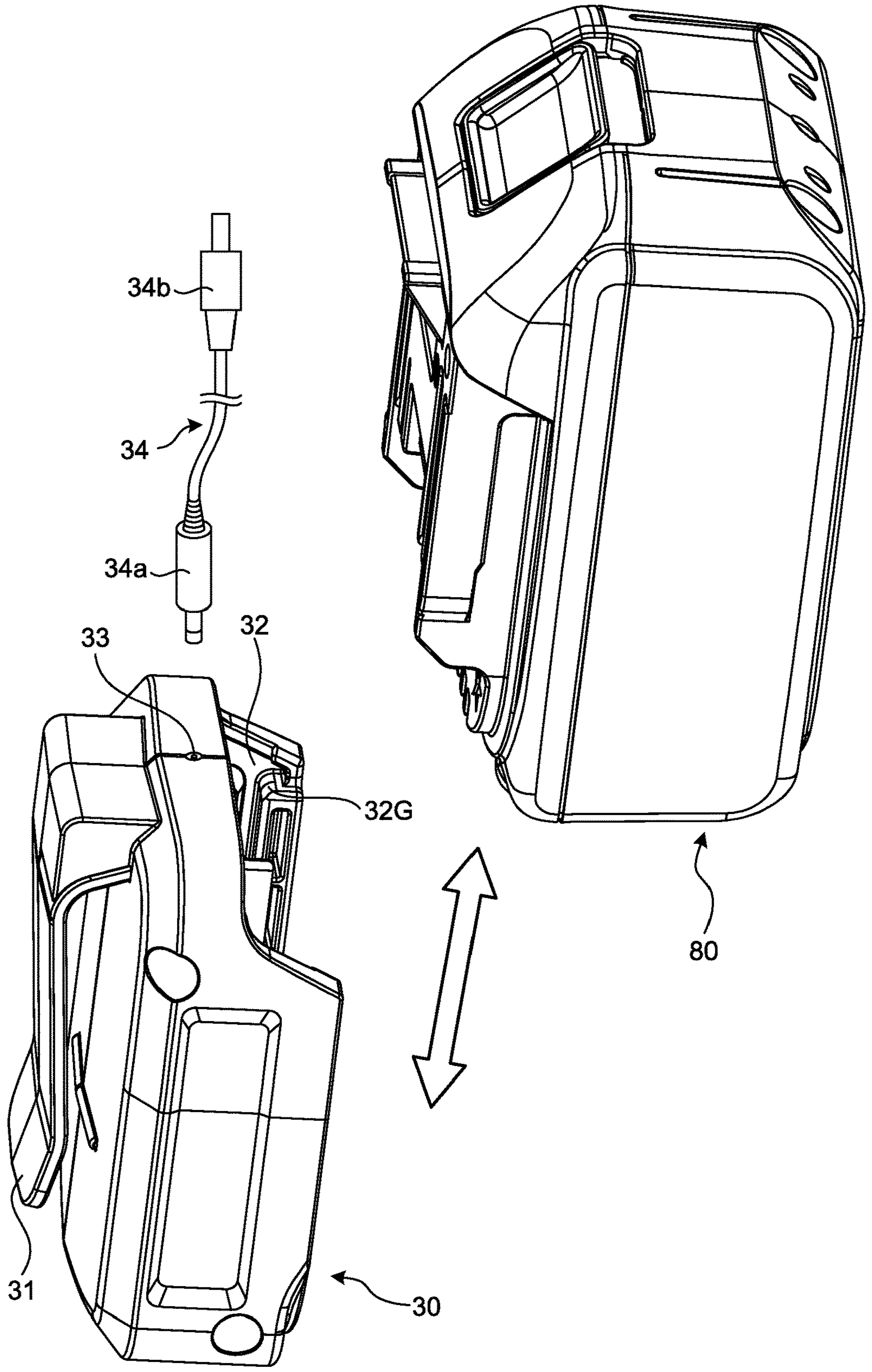
FIG. 9 is another perspective view of an example of the adapter and the power source unit according to the present embodiment.

FIGS. 8 and 9 are perspective views of an example of the adapter 30 and the power source unit 80 according to the present embodiment. FIG. 8 illustrates a state where the power source unit 80 is attached to the adapter 30. FIG. 9 illustrates a state where the power source unit 80 is detached from the adapter 30.

The adapter 30 is detachably mounted to the jacket 11. On the adapter 30, the power source unit 80 is detachably mounted. The adapter 30 includes: a fixed part 31 to be fixed to the jacket 11; a battery attachment part 32 to which the power source unit 80 is attached; and a connection part 33 to which a terminal of a cable is connected.

The fixed part 31 is hung on at least part of the jacket 11, thereby being fixed to the jacket 11. The fixed part 31 is fixed to the jacket 11, thereby attaching the adapter 30 to the jacket 11. The fixing of the fixed part 31 to the jacket 11 is released, thereby removing the adapter 30 from the jacket 11.

The fixed part 31 may be provided to a portion other than the jacket 11. In this case, the adapter 30 can be fixed to a portion other than the jacket 11. The fixed part 31 may be provided to a belt or a pair of pants worn by the worker, for example. With this structure, the adapter 30 can be attached to the waist or the legs of the worker, for example. Alternatively, the fixed part 31 is not necessarily provided. In this case, the adapter 30 and the power source unit 80 may be accommodated in an accommodation part (e.g., a pocket) of the jacket 11 or a pair of pants, for example.

The battery attachment part 32 is coupled to the power source unit 80. The power source unit 80 is a supply source of electric power supplied from the power source terminals 21 to the power tool 50 and the control circuit 40, which will be described later. The power source unit 80 is a rechargeable battery, for example. The power source unit 80 is attached to the battery attachment part 32. The battery attachment part 32 has a guide 32G that guides the power source unit 80. The power source unit 80 is slid along the battery attachment part 32 while being guided by the guide 32G, thereby being attached to the battery attachment part 32. The power source unit 80 is attached to the adapter 30, thereby making the adapter 30 and the power source unit 80 electrically continuous.

The connection part 33 has a recessed connection port formed in part of the adapter 30, for example (refer to FIG. 9). The connection part 33 is not necessarily provided at the position illustrated in FIG. 9 and may be provided at another position. A first terminal 34*a* of a cable 34 can be attached to the connection part 33. The terminal 34*a* of the cable 34 is attached to the connection part 33, thereby being electrically connected to the connection part 33. The terminal 34*a* is detachable from the connection part 33. A second terminal 34*b* of the cable 34 is connected to the power source terminals 21 via the control circuit 40, which will be described later. The connection part 33 may have not a recessed shape but a shape protruding from the adapter 30, for example. The adapter 30 and the cable 34 may be integrated. In this case, the cable 34 is not provided with the terminal 34*a* and extends directly from the adapter 30. The terminal 34*b* connected to the control circuit 40 is provided at the end of the cable 34. A cable may extend integrally from the adapter 30, and the port of the connection part 33 may be provided at the end of the cable. The terminal 34*b* may be connected to the control circuit 40 directly or via another terminal, for example. The control circuit 40 and the cable 34 may be integrated. In this case, the cable 34 is not provided with the terminal 34*b* and extends directly from the control circuit 40.

Figure 10:
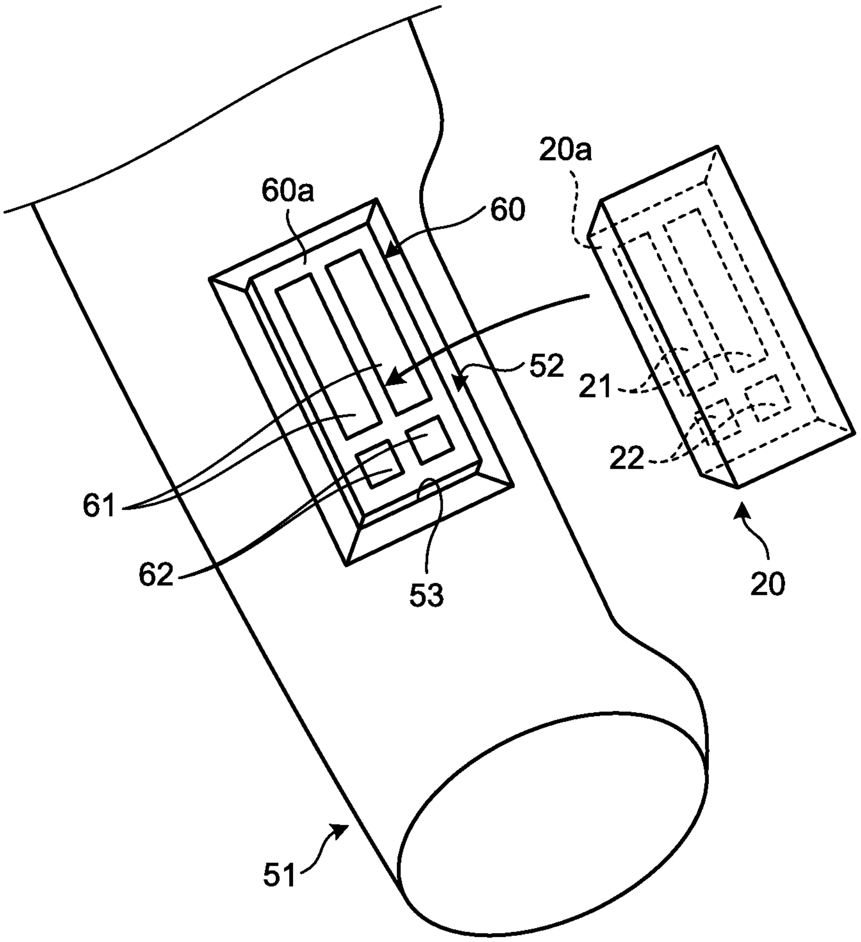
FIG. 10 is a perspective view illustrating a state where the connecting member is to be attached to a tool-side attachment part.

The following describes an example of the use mode of the power tool system SYS having the configuration described above. FIG. 10 is a perspective view illustrating a state where the connecting member 20 is to be attached to the tool-side attachment part 52. The connecting member 20 according to the present embodiment is disposed at a position corresponding to the base part of the index finger and the middle finger on the wearing part 10 when the worker wears the wearing part 10. The tool-side attachment part 52 is disposed at a position corresponding to the base part of the index finger and the middle finger on the palm of the worker's hand when the worker grips a predetermined position. With this structure, the worker wearing the wearing part 10 grips the grip 51 of the power tool 50, thereby inserting the connecting member 20 disposed on the wearing part 10 into the tool-side attachment part 52 of the grip 51. The connecting member 20 has a truncated quadrangular pyramid shape, and the tool-side attachment part 52 is a recess corresponding to the truncated quadrangular pyramid shape. With this structure, the inclined surfaces of the connecting member 20 are inserted along the inclination surfaces of the tool-side attachment part 52. Consequently, the connecting member 20 is positioned while being inserted into the tool-side attachment part 52.

Figure 11:
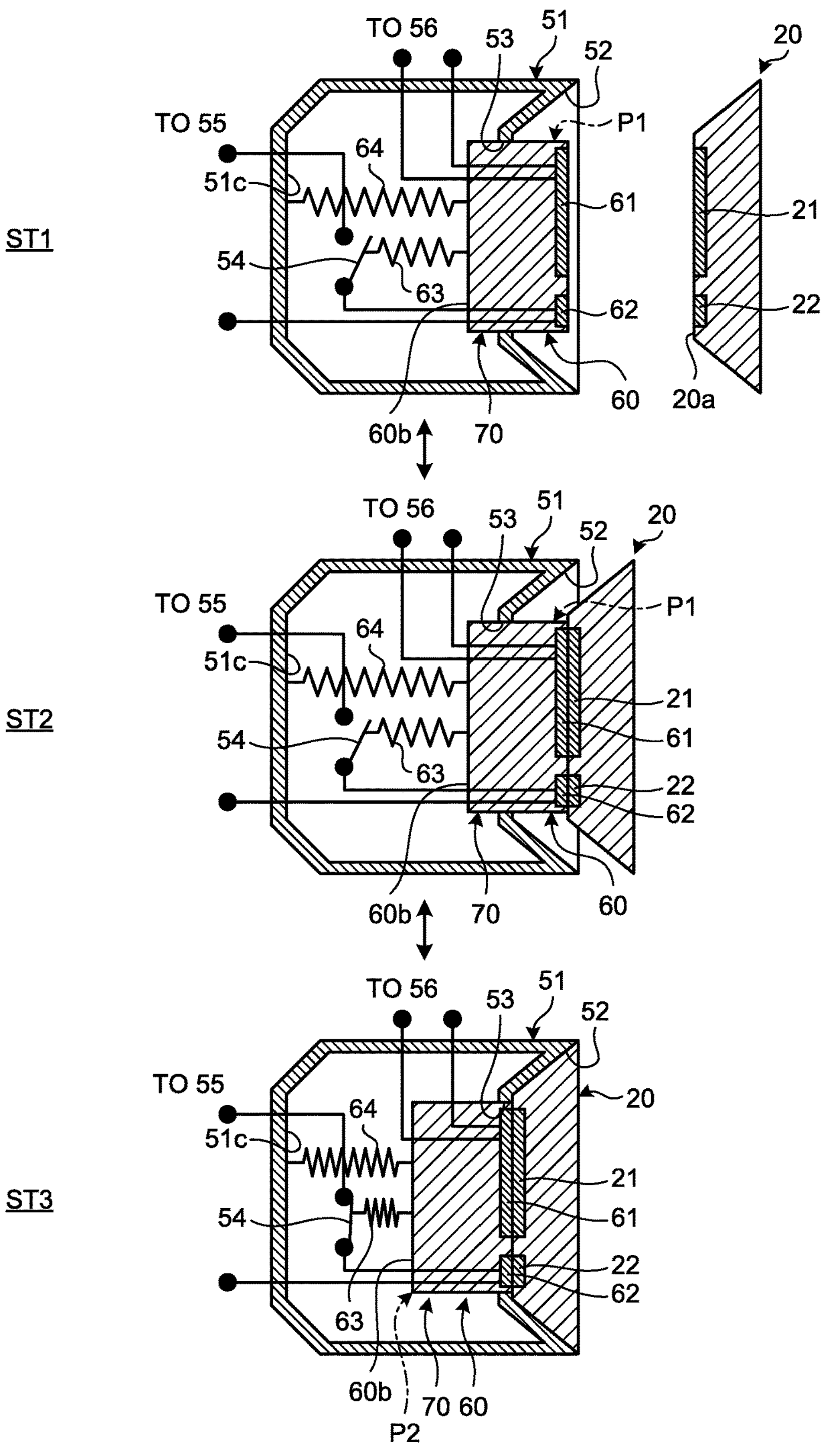
FIG. 11 schematically illustrates attached and detached states of the connecting member.
Figure 12:
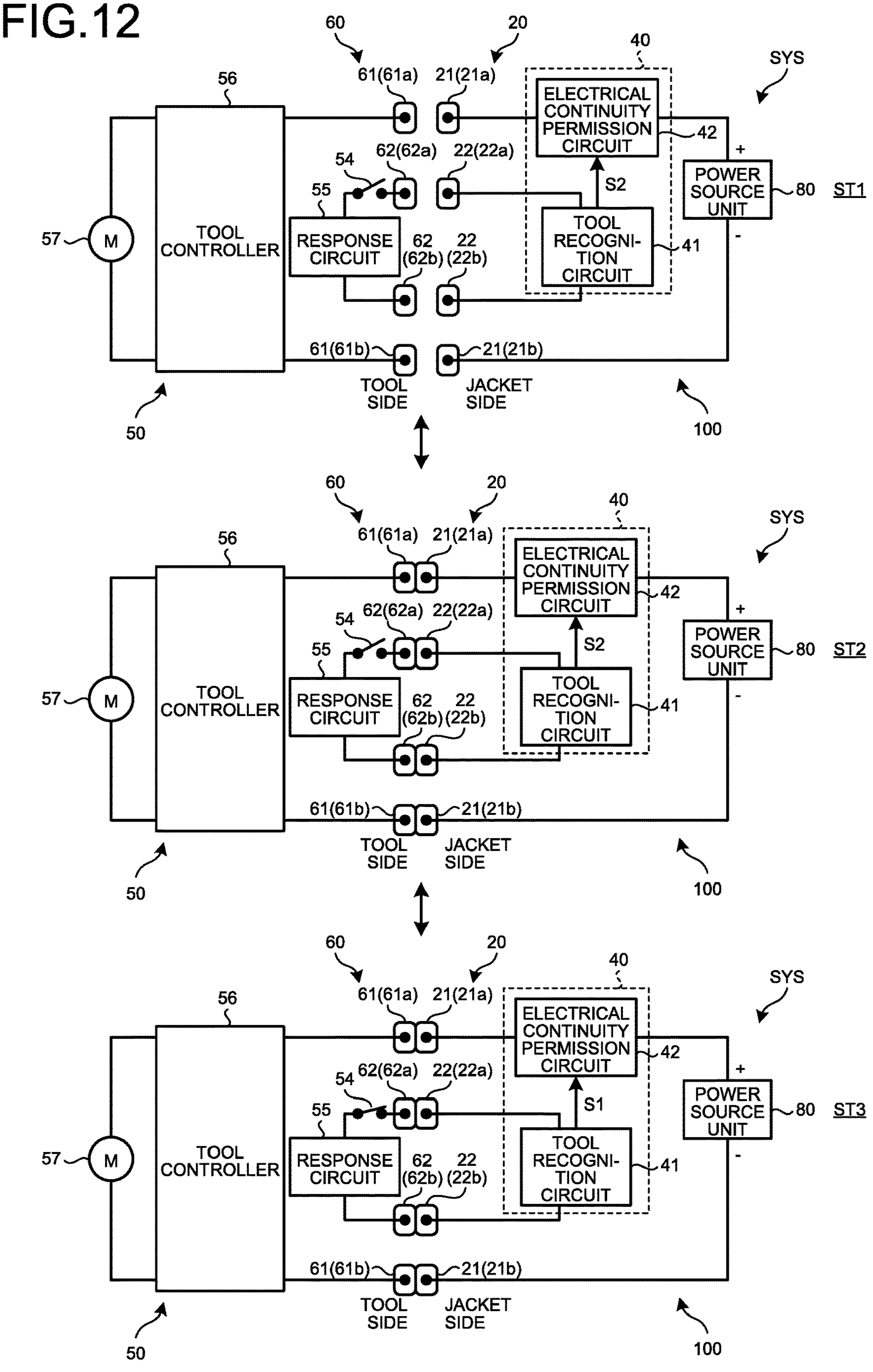
FIG. 12 schematically illustrates the attached and detached states of the connecting member.

FIGS. 11 and 12 schematically illustrate attached and detached states of the connecting member 20. FIG. 11 illustrates a sectional configuration, and FIG. 12 illustrates electrical connection. In the following description, the power source unit 80 is attached to the adapter 30 in the power tool system SYS.

As illustrated in FIGS. 11 and 12, the attached and detached states between the connecting member 20 and the tool-side attachment part 52 include a separated state, an attached state, and an intermediate state. The separated state is a state where the connecting member 20 is removed from the tool-side attachment part 52, for example. The attached state is a state where the connecting member 20 is attached to the tool-side attachment part 52, for example. More specifically, the attached state is a state where the terminal arrangement surface 20*a* of the connecting member 20 comes into contact with the bottom of the tool-side attachment part 52. The intermediate state is a state in a period transitioning from the separated state to the attached state or a state in a period transitioning from the attached state to the separated state.

In the separated state, the switching unit 70 is in a first state ST1 where the power source terminals 21 are electrically disconnected from the tool-side power source terminals 61, and the signal terminals 22 are electrically disconnected from the response circuit 55. As illustrated in FIG. 11, in the first state ST1, the tool-side connecting member 60 is held by the elastic member 64 at the reference position P1. The tool-side first terminal 62*a* is electrically disconnected from the response circuit 55 by the switch 54. As a result, the tool-side signal terminals 62 receive no response signal. As illustrated in FIGS. 11 and 12, for example, the power source terminals 21 are separated from the tool-side power source terminals 61, and the signal terminals 22 are separated from the tool-side signal terminals 62.

As a result, the tool recognition circuit 41 in the control circuit 40 detects no input of the response signal. Consequently, the tool recognition circuit 41 outputs the electrical continuity prohibition signal S2 to the electrical continuity permission circuit 42. The electrical continuity permission circuit 42 receives the electrical continuity prohibition signal S2 as the output signal from the tool recognition circuit 41. As a result, the electrical continuity permission circuit 42 makes the positive electrode of the power source unit 80 and the positive electrode terminal 21*a* of the power source terminals 21 electrically discontinuous.

In the intermediate state, the switching unit 70 is in a second state ST2 where the power source terminals 21 come into contact with the tool-side power source terminals 61, and the signal terminals 22 are electrically disconnected from the response circuit 55. As illustrated in FIGS. 11 and 12, in the second state ST2, the power source terminals 21 are in contact with the tool-side power source terminals 61, and the signal terminals 22 are in contact with the tool-side signal terminals 62. The tool-side first terminal 62*a*, however, is electrically disconnected from the response circuit 55 by the switch 54.

As a result, the tool recognition circuit 41 in the control circuit 40 detects no input of the response signal. Consequently, the tool recognition circuit 41 outputs the electrical continuity prohibition signal S2 to the electrical continuity permission circuit 42. The electrical continuity permission circuit 42 receives the electrical continuity prohibition signal S2 as the output signal from the tool recognition circuit 41. As a result, the electrical continuity permission circuit 42 makes the positive electrode of the power source unit 80 and the positive electrode terminal 21*a* of the power source terminals 21 electrically discontinuous. In the second state ST2, the power source terminals 21 are in contact with the tool-side power source terminals 61, but the positive electrode of the power source unit 80 and the positive electrode terminal 21*a* of the power source terminals 21 are electrically discontinuous. Consequently, no electric power is supplied from the power source unit 80 to the power tool 50.

In the attached state, the switching unit 70 is in a third state ST3 where the power source terminals 21 are electrically connected to the tool-side power source terminals 61, and the signal terminals 22 are electrically connected to the response circuit 55. As illustrated in FIG. 11, in the third state ST3, the tool-side connecting member 60 is held by the elastic member 64 at the connection position P2. The tool-side first terminal 62*a* is electrically connected to the response circuit 55 by the switch 54. As a result, the response signal is input from the response circuit 55 to the tool-side signal terminals 62. As illustrated in FIGS. 11 and 12, the power source terminals 21 come into contact with the tool-side power source terminals 61, and the signal terminals 22 come into contact with the tool-side signal terminals 62.

As a result, the tool recognition circuit 41 in the control circuit 40 detects input of the response signal. Consequently, the tool recognition circuit 41 outputs the electrical continuity permission signal S1 to the electrical continuity permission circuit 42. The electrical continuity permission circuit 42 receives the electrical continuity permission signal S1 as the output signal from the tool recognition circuit 41. As a result, the electrical continuity permission circuit 42 makes the positive electrode of the power source unit 80 and the positive electrode terminal 21*a* of the power source terminals 21 electrically continuous. In the third state ST3, the power source terminals 21 are electrically connected to the tool-side power source terminals 61, and the positive electrode of the power source unit 80 and the positive electrode terminal 21*a* of the power source terminals 21 are electrically continuous. Consequently, the tool controller 56 of the power tool 50 is electrically connected to the positive electrode of the power source unit 80 via the tool-side positive electrode terminal 61*a* and the positive electrode terminal 21*a*. The tool controller 56 is also electrically connected to the negative electrode of the power source unit 80 via the tool-side negative electrode terminal 61*b* and the negative electrode terminal 21*b*. Consequently, the electric power is supplied from the power source unit 80 to the tool controller 56 (power tool 50).

When the worker wearing the wearing part 10 does not grip the grip 51 of the power tool 50, for example, the connecting member 20 is in the separated state where it is removed from the tool-side attachment part 52. As a result, the power tool system SYS is brought into the first state ST1. When the worker tries to grip the grip 51 in this state, the power tool system SYS is brought into the intermediate state. In the intermediate state, the worker puts the hand on the grip 51, for example. As a result, the connecting member 20 fits into the tool-side attachment part 52, and the terminal arrangement surface 20*a* comes into contact with the tool-side terminal arrangement surface 60*a*. At this time, the power tool system SYS is brought into the second state ST2.

Subsequently, the worker grips the grip 51, thereby thrusting the connecting member 20 into the tool-side attachment part 52. As a result, the tool-side connecting member 60 is thrusted into the space 51K and disposed at the connection position P2. The movement of the tool-side connecting member 60 causes the link 63 to contract and close the switch 54. The switch 54 is closed, thereby connecting the response circuit 55 to the tool-side first terminal 62*a*. As a result, the power tool system SYS is brought into the third state ST3. In the third state ST3, the worker can operate the power tool 50 by performing an operation of pulling a trigger T (refer to FIG. 5) of the grip 51, for example.

Subsequently, when the worker tries to release the grip 51 and remove the connecting member 20 from the tool-side attachment part 52 in the third state ST3, the power tool system SYS is brought into the intermediate state. In the intermediate state, if the worker reduces the force of gripping the grip 51, the force of thrusting the tool-side connecting member 60 into the space 51K is weakened. If this force is smaller than the elastic force of the link 63, the elastic member 64 is restored. As a result, the tool-side connecting member 60 is returned to the reference position P1 with the terminal arrangement surface 20*a* of the connecting member 20 remaining in contact with the tool-side terminal arrangement surface 60*a* of the tool-side connecting member 60. The switch 54 is opened by being pulled by the link 63, thereby cutting off the electrical connection between the response circuit 55 and the tool-side first terminal 62*a*. Consequently, the power tool system SYS is brought into the second state ST2. In this case, the tool recognition circuit 41 detects no input of the response signal and outputs the electrical continuity prohibition signal S2 to the electrical continuity permission circuit 42. The electrical continuity permission circuit 42 receives the electrical continuity prohibition signal S2, thereby making the positive electrode of the power source unit 80 and the positive electrode terminal 21*a* of the power source terminals 21 electrically discontinuous. As a result, no electric current flows between the power source terminals 21 and the tool-side power source terminals 61 with the positive electrode terminal 21*a* of the power source terminals 21 remaining in contact with the tool-side positive electrode terminal 61*a* of the tool-side power source terminals 61 and with the negative electrode terminal 21*b* remaining in contact with the tool-side negative electrode terminal 61*b*.

When the worker separates the hand from the grip 51 in this state, the terminal arrangement surface 20*a* is separated from the tool-side terminal arrangement surface 60*a*, and the connecting member 20 is removed from the tool-side attachment part 52. As a result, the power tool system SYS is brought into the first state ST1. In the present embodiment, an electric current is prevented from flowing between the power source terminals 21 and the tool-side power source terminals 61 with the power source terminals 21 remaining in contact with the tool-side power source terminals 61; and subsequently, the power source terminals 21 is separated from the tool-side power source terminals 61. This makes it possible to suppress an arc current or the like generated between the power source terminals 21 and the tool-side power source terminals 61.

As described above, the power supply system 100 according to the present embodiment includes the wearing part 10, the connecting member 20, the adapter 30, and the control circuit 40. The wearing part 10 is worn on a hand of a worker. The connecting member 20 is held by the wearing part 10. The connecting member 20 is disposed at a position where it is attached to the tool-side attachment part 52 provided on the grip 51 of the power tool 50 when the worker wearing the wearing part 10 grips the grip 51. The connecting member 20 includes the terminal arrangement surface 20*a* having a planar shape and provided with the power source terminals 21 that supply electric power to the power tool 50 and the signal terminals 22 that receive a response signal from the power tool 50 in an exposed manner. The power source terminals 21 and the signal terminals 22 are electrically connected to the power tool 50 when the connecting member 20 is attached to the tool-side attachment part 52. The adapter 30 is mountable with the power source unit 80 serving as a supply source of the electric power. The control circuit 40 detects whether the signal terminals 22 receive the response signal when the power source unit 80 is attached to the adapter 30. If the response signal is detected, the control circuit 40 makes the power source terminals 21 and the power source unit 80 electrically continuous. If no response signal is detected, the control circuit 40 makes the power source terminals 21 and the power source unit 80 electrically discontinuous.

If the signal terminals 22 receive no response signal of the power tool 50, the power source terminals 21 and the power source unit 80 are electrically discontinuous. Consequently, the power supply system 100 can prevent an electrical short circuit between a plurality of terminals when a conductive member, such as a wire, a nail, a screw, and a bolt, comes into contact with the terminals in the configuration where the power source terminals 21 and the signal terminals 22 are disposed and exposed on the terminal arrangement surface 20*a* having a planar shape.

After the worker grips the grip 51 to thrust the connecting member 20 into the tool-side attachment part 52, when the worker releases the grip 51 and removes the connecting member 20 from the tool-side attachment part 52, an electric current can be prevented from flowing between the power source terminals 21 and the tool-side power source terminals 61 with the power source terminals 21 remaining in contact with the tool-side power source terminals 61. With this configuration, the power source terminals 21 and the tool-side power source terminals 61 can be prevented from being separated while an electric current flows therebetween. This makes it possible to suppress an arc current generated between the power source terminals 21 and the tool-side power source terminals 61.

In the power supply system 100 according to the present embodiment, the control circuit 40 includes the tool recognition circuit 41 and the electrical continuity permission circuit 42. The tool recognition circuit 41 outputs the electrical continuity permission signal S1 if the signal terminals 22 receive input of the response signal and outputs the electrical continuity prohibition signal S2 if the signal terminals 22 receive no input of the response signal. The electrical continuity permission circuit 42 receives an output signal from the tool recognition circuit 41. The electrical continuity permission circuit 42 makes the power source terminals 21 and the power source unit 80 electrically continuous if the output signal is the electrical continuity permission signal S1 and makes the power source terminals 21 and the power source unit 80 electrically discontinuous if the output signal is the electrical continuity prohibition signal S2. With this configuration, the electrical connection state between the power source terminals 21 and the power source unit 80 can be switched simply and effectively.

In the power supply system 100 according to the present embodiment, the power source terminals 21 include the positive electrode terminal 21*a* and the negative electrode terminal 21*b*. The positive electrode terminal 21*a* is connected to the positive electrode of the power source unit 80 via the electrical continuity permission circuit 42. The negative electrode terminal 21*b* is connected to the negative electrode of the power source unit 80. The positive electrode terminal 21*a* and the negative electrode terminal 21*b* are disposed on the terminal arrangement surface 20*a*. This makes it possible to prevent a short circuit between the positive electrode terminal 21*a* and the negative electrode terminal 21*b*.

In the power supply system 100 according to the present embodiment, the signal terminals 22 include the first terminal 22*a* and the second terminal 22*b* connected to the tool recognition circuit 41. The first terminal 22*a* and the second terminal 22*b* are disposed on the terminal arrangement surface 20*a*. This makes it possible to prevent a short circuit between the first terminal 22*a* and the second terminal 22*b*.

The power supply system 100 according to the present embodiment further includes the jacket 11 provided with the adapter 30 and worn by the worker. The wearing part 10 is coupled to the sleeve 12 of the jacket 11. With this configuration, the worker can wear both of the wearing part 10 and the adapter 30 together by wearing the jacket 11.

The power tool system SYS according to the present embodiment includes the power tool 50 and the power supply system 100. The power tool 50 includes the grip 51 gripped by the worker and is provided with the tool-side attachment part 52 on the grip 51. The power supply system 100 supplies electric power to the power tool 50. With this configuration, the power tool system SYS can prevent an electrical short circuit.

In the power tool system SYS according to the embodiment, the power tool 50 includes the tool controller 56, the tool-side power source terminals 61, the response circuit 55, and the tool-side signal terminals 62. The tool controller 56 controls the power tool 50. The tool-side power source terminals 61 are connected to the tool controller 56. The response circuit 55 outputs the response signal. The tool-side signal terminals 62 are connected to the response circuit 55. With this configuration, the power supply system 100 can supply electric power in a simpler manner.

Second Embodiment

Figure 13:
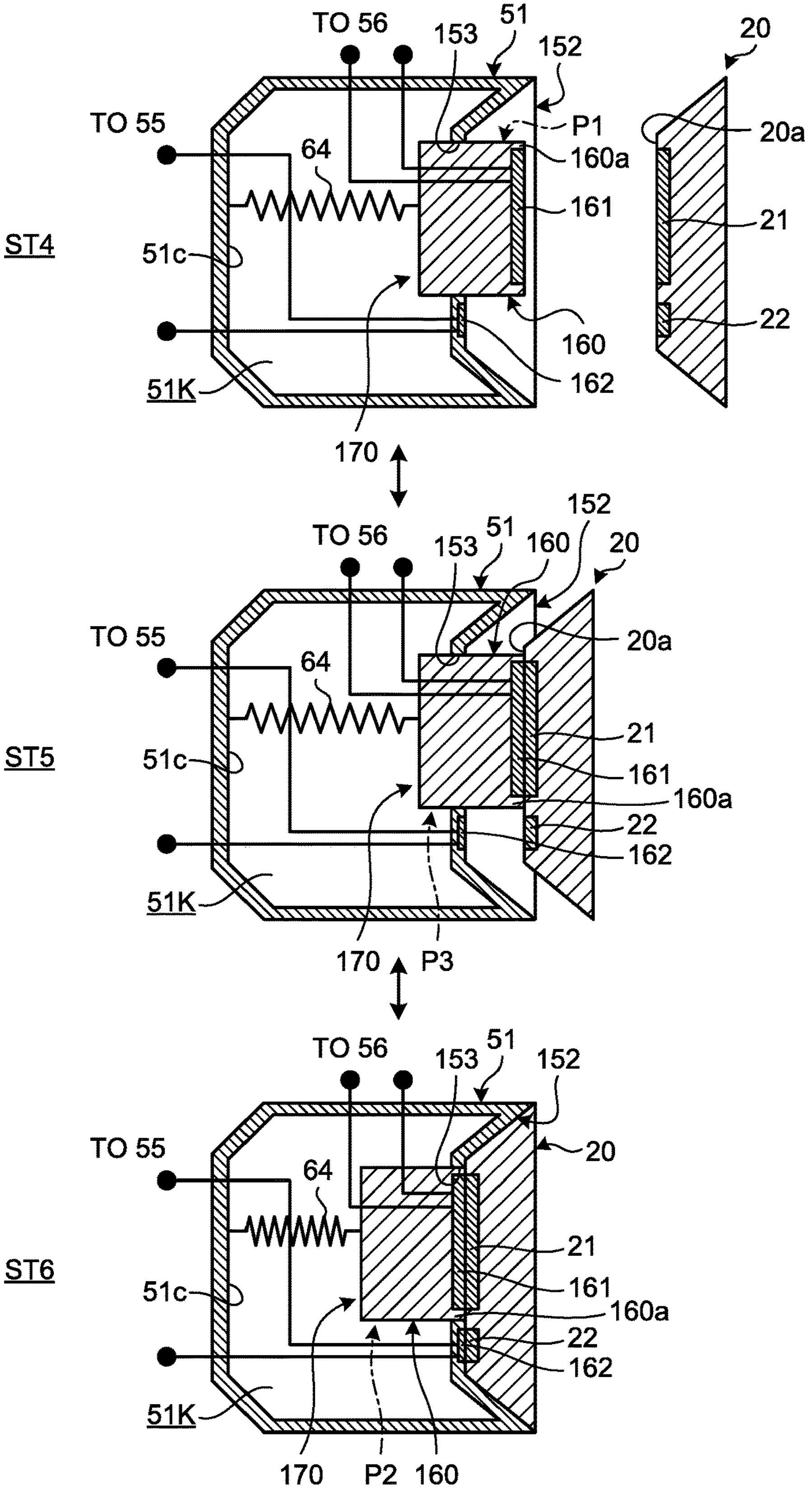
FIG. 13 is a view of an example of the power tool system according to a second embodiment and schematically illustrates the attached and detached states of the connecting member.
Figure 14:
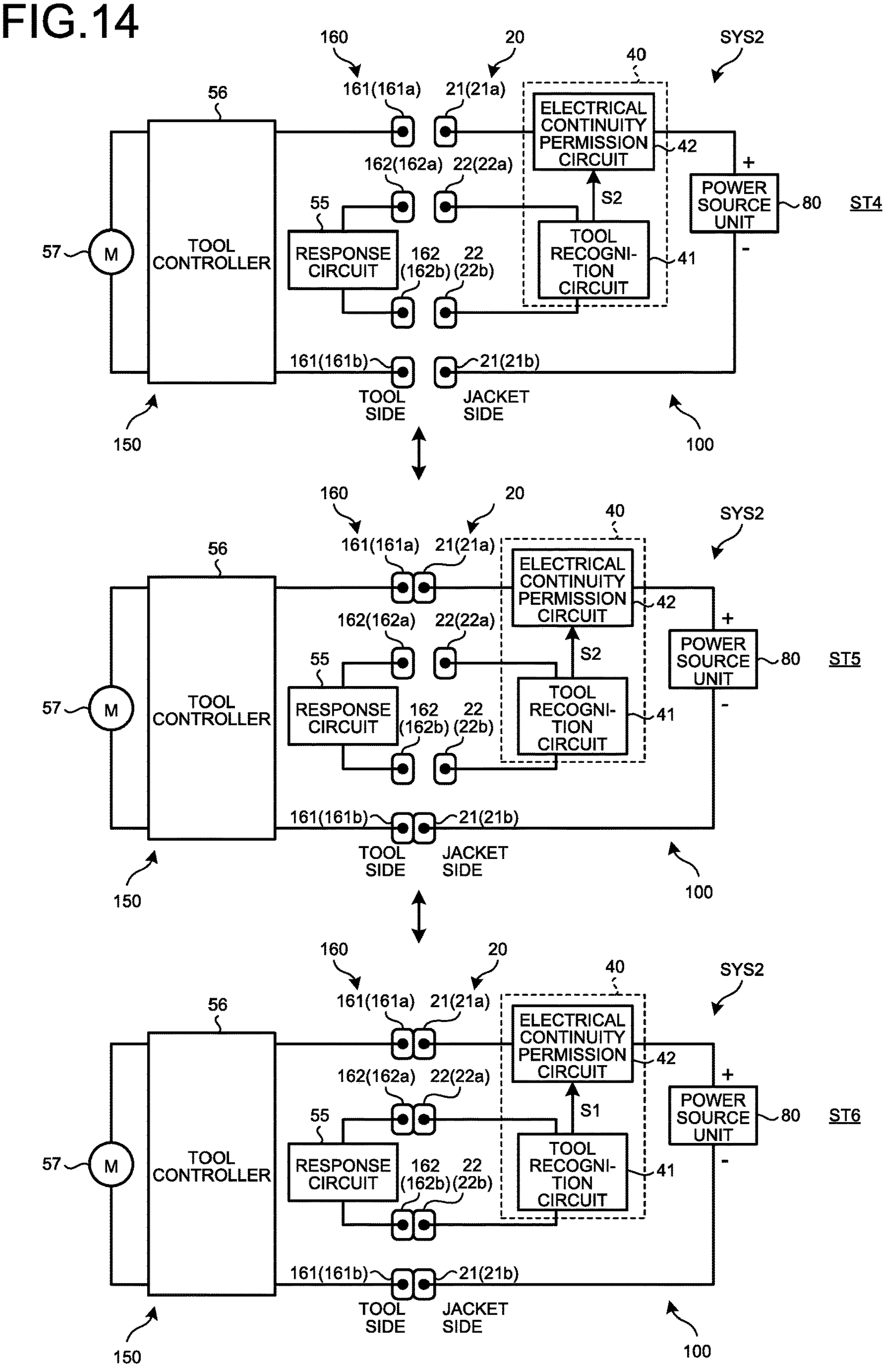
FIG. 14 schematically illustrates the attached and detached states of the connecting member.

The following describes a second embodiment. FIGS. 13 and 14 are a view and a diagram of an example of a power tool system SYS2 according to the second embodiment. FIG. 13 illustrates a sectional configuration of the connecting member 20 and a tool-side attachment part 152. FIG. 14 illustrates the states of electrical connection of the power tool system SYS2. Because the configuration of a power tool 150 is different from that of the first embodiment, the present embodiment mainly describes the difference. Specifically, the position of the tool-side signal terminals is changed and the switch 54 is omitted, as compared with the first embodiment.

As illustrated in FIGS. 13 and 14, the power tool system SYS2 includes the power tool 150 and the power supply system 100. The power tool 150 includes the tool-side attachment part 152 at part of the grip 51. The tool-side attachment part 152 has a bottom. The bottom of the tool-side attachment part 152 has an opening 153.

The opening 153 is connected to the space 51K of the grip 51. A tool-side connecting member 160 is disposed in the opening 153. The tool-side connecting member 160 has a rectangular columnar shape, for example, and has a tool-side terminal arrangement surface 160*a* and a supported surface. The tool-side terminal arrangement surface 160*a* comes into contact with the terminal arrangement surface 20*a* of the connecting member 20 when the connecting member 20 is attached to the tool-side attachment part 152. The tool-side terminal arrangement surface 160*a* is provided with tool-side power source terminals 161. The tool-side power source terminals 161 include a tool-side positive electrode terminal 161*a* and a tool-side negative electrode terminal 161*b*.

The bottom of the tool-side attachment part 152 comes into contact with the terminal arrangement surface 20*a* when the connecting member 20 is attached to the tool-side attachment part 152. Tool-side signal terminals 162 are disposed on the bottom of the tool-side attachment part 152. The tool-side signal terminals 162 include a tool-side first terminal 162*a* and a tool-side second terminal 162*b*.

The supported surface of the tool-side connecting member 160 is supported by the inner wall 51*c* defining the space 51K of the grip 51 using the elastic member 64, such as a spring. The tool-side connecting member 160 is held at the reference position P1 with no force applied thereto from the outside. When force toward the inside of the tool-side attachment part 152 is applied to the tool-side connecting member 160 from the outside, the elastic member 64 is elastically deformed, thereby enabling the tool-side connecting member 160 to move toward the space 51K. When the force applied in the tool-side attachment part 152 toward the inside of the space 51K is released, the tool-side connecting member 160 returns to the reference position P1 by the elastic force of the elastic member 64. The tool-side power source terminal 161 according to the present embodiment moves together with the tool-side connecting member 160. By contrast, the position of the tool-side signal terminals 162 remains fixed at the bottom of the tool-side attachment part 152.

In the tool-side attachment part 152, a switching unit 170 includes the tool-side connecting member 160 and the elastic member 64. The switching unit 170 switches electrical connection between the power source terminals 21 and the tool-side power source terminals 161 as well as electrical connection between the signal terminals 22 and the response circuit 55.

In the separated state, the switching unit 170 is in a fourth state ST4 where the power source terminals 21 are electrically disconnected from the tool-side power source terminals 161, and the signal terminals 22 are electrically disconnected from the response circuit 55. As illustrated in FIG. 13, in the fourth state ST4, the tool-side connecting member 160 is held by the elastic member 64 at the reference position P1. As illustrated in FIGS. 13 and 14, for example, the power source terminals 21 are separated from the tool-side power source terminals 161, and the signal terminals 22 are separated from the tool-side signal terminals 162.

As a result, the tool recognition circuit 41 in the control circuit 40 detects no input of the response signal. Consequently, the tool recognition circuit 41 outputs the electrical continuity prohibition signal S2 to the electrical continuity permission circuit 42. The electrical continuity permission circuit 42 receives the electrical continuity prohibition signal S2 as the output signal from the tool recognition circuit 41. As a result, the electrical continuity permission circuit 42 makes the positive electrode of the power source unit 80 and the positive electrode terminal 21*a* of the power source terminals 21 electrically discontinuous.

In the intermediate state, the switching unit 170 is in a fifth state ST5 where the power source terminals 21 come into contact with the tool-side power source terminals 161, and the signal terminals 22 are electrically disconnected from the response circuit 55. As illustrated in FIG. 13, in the fifth state ST5, the tool-side connecting member 160 is held by the elastic member 64 at an intermediate position P3. The intermediate position P3 is present between the reference position P1 and the connection position P2, which will be described later. As illustrated in FIGS. 13 and 14, when the tool-side connecting member 160 is supported at the intermediate position P3, the power source terminals 21 are in contact with the tool-side power source terminals 161, but the signal terminals 22 are separated from the tool-side signal terminals 162.

As a result, the tool recognition circuit 41 in the control circuit 40 detects no input of the response signal. Consequently, the tool recognition circuit 41 outputs the electrical continuity prohibition signal S2 to the electrical continuity permission circuit 42. The electrical continuity permission circuit 42 receives the electrical continuity prohibition signal S2 as the output signal from the tool recognition circuit 41. As a result, the electrical continuity permission circuit 42 makes the positive electrode of the power source unit 80 and the positive electrode terminal 21*a* of the power source terminals 21 electrically discontinuous. In the fifth state ST5, the power source terminals 21 are in contact with the tool-side power source terminals 161, but the positive electrode of the power source unit 80 and the positive electrode terminal 21*a* of the power source terminals 21 are electrically discontinuous. Consequently, no electric power is supplied from the power source unit 80 to the power tool 150.

In the attached state, the switching unit 170 is in a sixth state ST6 where the power source terminals 21 are electrically connected to the tool-side power source terminals 161, and the signal terminals 22 are electrically connected to the response circuit 55. As illustrated in FIG. 13, in the sixth state ST6, the tool-side connecting member 160 is held by the elastic member 64 at the connection position P2. As illustrated in FIGS. 13 and 14, the power source terminals 21 are in contact with the tool-side power source terminals 161, and the signal terminals 22 are in contact with the tool-side signal terminals 162. Consequently, the response signal is input from the response circuit 55 to the tool-side signal terminals 162.

As a result, the tool recognition circuit 41 in the control circuit 40 detects input of the response signal. Consequently, the tool recognition circuit 41 outputs the electrical continuity permission signal S1 to the electrical continuity permission circuit 42. The electrical continuity permission circuit 42 receives the electrical continuity permission signal S1 as the output signal from the tool recognition circuit 41. As a result, the electrical continuity permission circuit 42 makes the positive electrode of the power source unit 80 and the positive electrode terminal 21*a* of the power source terminals 21 electrically continuous. In the sixth state ST6, the power source terminals 21 are electrically connected to the tool-side power source terminals 161, and the positive electrode of the power source unit 80 and the positive electrode terminal 21*a* of the power source terminals 21 are electrically continuous. Consequently, the electric power is supplied from the power source unit 80 to the tool controller 56 (power tool 150).

In the power tool system SYS2 according to the present embodiment, the tool-side attachment part 152 is provided with the tool-side signal terminals 162 at a position where they come into contact with the signal terminals 22 in the attached state. The switching unit 170 includes the tool-side connecting member 160 and the elastic member 64. The tool-side connecting member 160 has the tool-side terminal arrangement surface 160*a* having a planar shape on which the tool-side power source terminals 161 are provided in an exposed manner. The elastic member 64 couples the inside of the grip 51 and the tool-side connecting member 160. In the separated state, the elastic member 64 supports the tool-side connecting member 160 at the reference position P1. In the attached state, the elastic member 64 supports the tool-side connecting member 160 at the connection position P2. The connection position P2 is present on the inner side of the grip 51 with respect to the reference position P1 and is a position where the tool-side power source terminals 161 come into contact with the power source terminals 21 and where the tool-side signal terminals 162 come into contact with the signal terminals 22. In the intermediate state, the elastic member 64 supports the tool-side connecting member 160 at the intermediate position P3. The intermediate position P3 is present between the reference position P1 and the connection position P2 and is a position where the tool-side power source terminals 161 come into contact with the power source terminals 21 and where the tool-side signal terminals 162 are separated from the signal terminals 22. This makes it possible to prevent an electrical short circuit between the terminals if the positions of the tool-side power source terminals 161 and the tool-side signal terminals 162 are different and suppress an arc current generated between the power source terminals 21 and the tool-side power source terminals 161.

Figure 15:
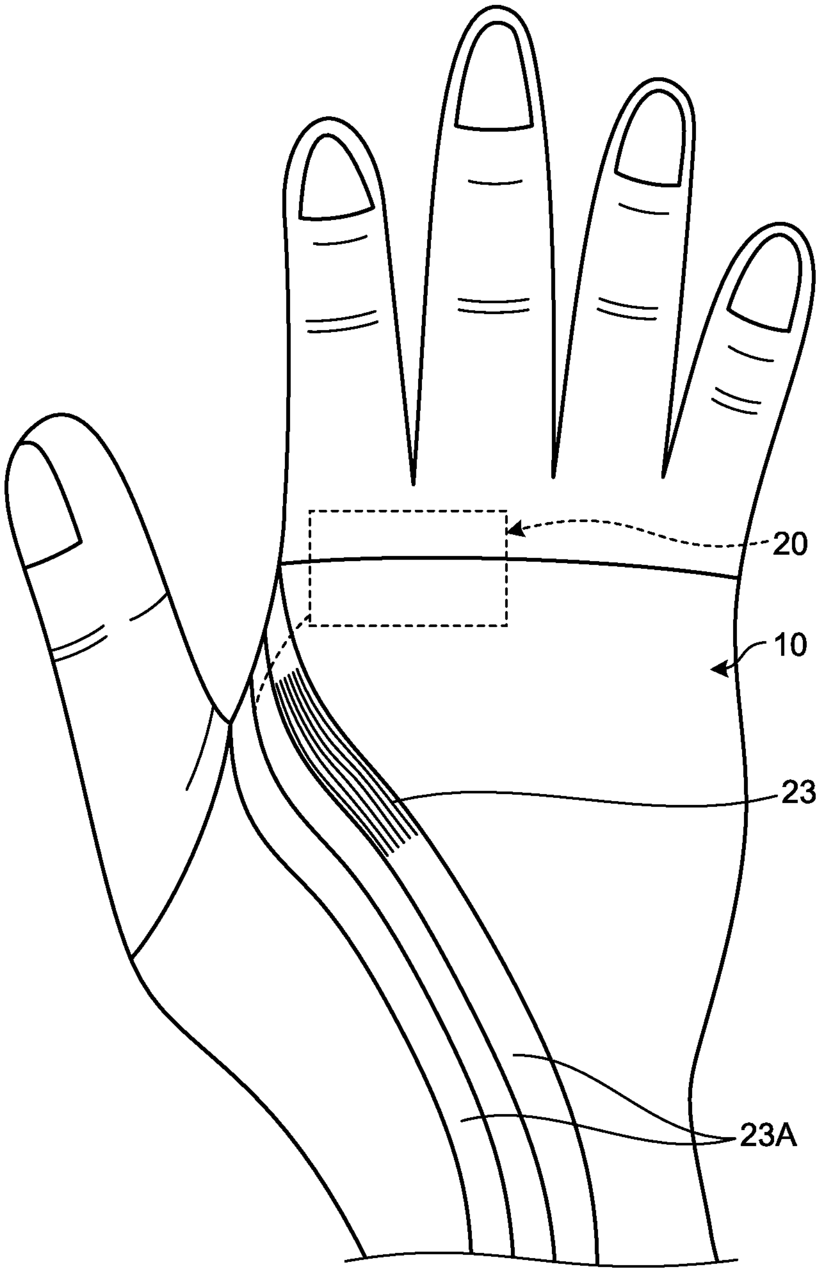
FIG. 15 is a view of the wearing part according to a modification.

The technical scope of the present invention is not limited to the embodiments above, and appropriate changes may be made without departing from the spirit of the invention. While the wires 23 connected to the power source terminals 21 and the signal terminals 22 have a linear form in the embodiments above, for example, the embodiments are not limited thereto. FIG. 15 is a view of the wearing part 10 according to a modification. FIG. 15 illustrates a configuration viewed from the back of the worker's hand. As illustrated in FIG. 15, cables 23A obtained by disposing the wires 23 side by side in a planar shape may be provided to connect the power source terminals 21 and the signal terminals 22 to the control circuit 40. Disposing the wires 23 in a planar shape can secure the cross-sectional area, thereby suppressing heat generation in the cables 23A.

While the tool-side attachment parts 52 and 152 are provided in advance to the power tools 50 and 150 in the embodiments above, for example, the embodiments are not limited thereto. Components corresponding to the tool-side attachment parts 52 and 152 may be attached to and detached from the grip 51 of the power tools 50 and 150, for example.

While the power supply system 100 includes the adapter 30 on which the power source unit 80 is mountable in the embodiments above, for example, the embodiments are not limited thereto. The power supply system 100 does not necessarily include the adapter 30, and the power source unit 80 may be included in the jacket 11, for example. Alternatively, the power supply system 100 does not necessarily include the adapter 30 and may use an AC power source as the power source unit 80. In this case, wires may extend from the jacket 11 and include a plug to be inserted into a socket of the AC power source at the end of the wires, for example. The power source unit 80 may be included in the power tools 50 and 150.

While the switch 54, the link 63, and the elastic member 64 are provided to the power tool 50 in the embodiments above, for example, the embodiments are not limited thereto. The switch 54, the link 63, and the elastic member 64 may be provided to the power supply system 100, such as the connecting member 20.

While the switch 54, the link 63, and the elastic member 64 are provided to the power tool 50 in the embodiments above, for example, the embodiments are not limited thereto. The switch 54, the link 63, and the elastic member 64 may be provided to the outside of the power tools 50 and 150, such as the connecting member 20.

While the control circuit 40 is disposed in the jacket 11 in the embodiments above, for example, the embodiments are not limited thereto. The control circuit 40 may be provided to the connecting member 20 or the power tools 50 and 150, for example. Furthermore, at least one of the tool recognition circuit 41 and the electrical continuity permission circuit 42 may be provided to the connecting member 20 or the power tools 50 and 150, for example.

REFERENCE SIGNS LIST

P1 reference position
P2 connection position
P3 intermediate position
S1 electrical continuity permission signal
T trigger
S2 electrical continuity prohibition signal
ST1 first state
ST2 second state
ST3 third state
ST4 fourth state
ST5 fifth state
ST6 sixth state
SYS, SYS2 power tool system
10 wearing part
11 jacket
12 sleeve
20 connecting member
20*a* terminal arrangement surface
20*b* held surface
21 power source terminal
21*a* positive electrode terminal
21*b* negative electrode terminal
22 signal terminal
22*a* first terminal
22*b* second terminal
23 wire
23A cable
30 adapter
31 fixed part
32 battery attachment part
32G guide
33 connection part
40 control circuit
41 tool recognition circuit
42 electrical continuity permission circuit
50, 150 power tool
51 grip
51K space
51*c* inner wall
52, 152 tool-side attachment part
53, 153 opening
54 switch
55 response circuit
56 tool controller
57 motor
60, 160 tool-side connecting member
60*a*, 160*a* tool-side terminal arrangement surface
60*b* supported surface
61, 161 tool-side power source terminal
61*a*, 161*a* tool-side positive electrode terminal
61*b*, 161*b* tool-side negative electrode terminal
62, 162 tool-side signal terminal
63 link
64 elastic member
70, 170 switching unit
80 power source unit
100 power supply system

The invention claimed is:

1. A power tool system comprising:

a power tool including:
- a grip gripped by a worker,
- a tool-side attachment part provided on the grip,
- a tool controller configured to control the power tool,
- a tool-side power source terminal connected to the tool controller,
- a response circuit configured to output the response signal, and
- a tool-side signal terminal connected to the response circuit; and a power supply system configured to supply electric power to the power tool, the power supply system comprising:

a wearing part worn on a hand of the worker;

a connecting member held by the wearing part, the connecting member being disposed at a position where the connecting member is attached to the tool-side attachment part provided on the grip of the power tool when the worker wearing the wearing part grips the grip, the connecting member having a terminal arrangement surface having a planar shape and provided with a power source terminal and a signal terminal in an exposed manner, the power source terminal being configured to supply electric power to the power tool, the signal terminal being configured to receive a response signal from the power tool, the power source terminal and the signal terminal being electrically connected to the power tool in an attached state where the connecting member is attached to the tool-side attachment part; and a control circuit configured to make the power source terminal and a power source unit electrically continuous when the signal terminal receives the response signal and make the power source terminal and the power source unit electrically discontinuous when the signal terminal receives no response signal, wherein the tool-side attachment part includes a switching unit configured to switch electrical connection between the power source terminal and the tool-side power source terminal and electrical connection between the signal terminal and the response circuit, the switching unit electrically disconnects the power source terminal from the tool-side power source terminal and electrically disconnects the signal terminal from the response circuit in an separated state where the connecting member is removed from the tool-side attachment part, the switching unit electrically connects the power source terminal to the tool-side power source terminal and electrically connects the signal terminal to the response circuit in an attached state where the connecting member is attached to the tool-side attachment part, and the switching unit brings the power source terminal into contact with the tool-side power source terminal and electrically disconnects the signal terminal from the response circuit in an intermediate state, the intermediate state being a state in a period transitioning from the separated state to the attached state or a state in a period transitioning from the attached state to the separated state.

2. The power tool system according to claim 1, wherein the switching unit comprises:

a tool-side connecting member including a tool-side terminal arrangement surface having a planar shape on which the tool-side power source terminal and the tool-side signal terminal are provided in an exposed manner;

an elastic member coupling inside of the grip and the tool-side connecting member, the elastic member being configured to support the tool-side connecting member at a reference position in the separated state, and support the tool-side connecting member at a connection position present on an inner side of the grip with respect to the reference position in the attached state;

a switch configured to switch a connection state between the tool-side signal terminal and the response circuit between a connected state and a disconnected state; and a link configured to cause the switch to switch to the disconnected state when the tool-side connecting member is disposed at the reference position, cause the switch to switch to the connected state when the tool-side connecting member is disposed at the connection position, and cause the switch to switch between the disconnected state and the connected state in conjunction with the tool-side connecting member while the tool-side connecting member moves between the reference position and the connection position.

3. The power tool system according to claim 1, wherein the tool-side attachment part is provided with the tool-side signal terminal at a position where the tool-side signal terminal comes into contact with the signal terminal in the attached state, and the switching unit comprises:

a tool-side connecting member having a tool-side terminal arrangement surface having a planar shape on which the tool-side power source terminal is provided in an exposed manner; and an elastic member coupling inside of the grip and the tool-side connecting member, the elastic member being configured to support the tool-side connecting member at a reference position in the separated state, support the tool-side connecting member at a connection position present on an inner side of the grip with respect to the reference position in the attached state, the connection position being a position where the tool-side power source terminal comes into contact with the power source terminal and where the tool-side signal terminal comes into contact with the signal terminal, and support the tool-side connecting member at an intermediate position present between the reference position and the connection position in the intermediate state, the intermediate position being a position where the tool-side power source terminal comes into contact with the power source terminal and where the tool-side signal terminal is separated from the signal terminal.

4. The power tool system according to claim 1, wherein the control circuit comprises:

a tool recognition circuit configured to output an electrical continuity permission signal when the signal terminal receives input of the response signal and output an electrical continuity prohibition signal when the signal terminal receives no input of the response signal; and an electrical continuity permission circuit configured to receive an output signal from the tool recognition circuit and configured to make the power source terminal and the power source unit electrically continuous when the output signal is the electrical continuity permission signal and make the power source terminal and the power source unit electrically discontinuous when the output signal is the electrical continuity prohibition signal.

5. The power tool system according to claim 4, wherein the power source terminal includes a positive electrode terminal connected to a positive electrode of the power source unit via the electrical continuity permission circuit and a negative electrode terminal connected to a negative electrode of the power source unit, and the positive electrode terminal and the negative electrode terminal are disposed on the terminal arrangement surface.

6. The tool supply system according to claim 4, wherein the signal terminal includes a first terminal and a second terminal connected to the tool recognition circuit, and the first terminal and the second terminal are disposed on the terminal arrangement surface.

7. The power tool system according to claim 1, further comprising:

a jacket worn by the worker, wherein the wearing part is coupled to a sleeve of the jacket.

8. The power tool system according to claim 1, further comprising:

an adapter to which the power source unit is detachably mounted, wherein the control circuit switches between the electrically continuous state and the electrically discontinuous state when the power source unit is attached to the adapter.

* * * * *